United States Patent [19]
Arnold et al.

[11] 3,993,874
[45] Nov. 23, 1976

[54] MULTI-STAGE SWITCHING NETWORKS FOR USE IN TELECOMMUNICATIONS EXCHANGES

[75] Inventors: John Spencer Arnold, Liverpool; James Leonard Charles Grimbly, Birkenhead, both of England

[73] Assignee: Plessey Handel und Investments AG., Zug, Switzerland

[22] Filed: Nov. 21, 1974

[21] Appl. No.: 526,043

[30] Foreign Application Priority Data
Nov. 22, 1973 United Kingdom............... 54200/73

[52] U.S. Cl. .............................. 179/22; 179/18 AG
[51] Int. Cl.² ......................................... H04Q 3/00
[58] Field of Search............ 179/18 E, 18 EA, 18 G, 179/18 GE, 18 GF, 22, 18 AG, 18 C

[56] References Cited
UNITED STATES PATENTS

| | | | |
|---|---|---|---|
| 3,382,323 | 5/1968 | Shirasu et al. | 179/22 |
| 3,482,043 | 12/1969 | Mathews | 179/18 GE |
| 3,541,267 | 11/1970 | Fukutomi et al. | 179/18 EA |
| 3,566,041 | 2/1971 | Ekberg et al. | 179/18 EA |
| 3,567,865 | 3/1971 | Chu et al. | 179/18 AG |
| 3,629,512 | 12/1971 | Yuan | 179/18 GE |
| 3,745,259 | 7/1973 | Romero et al. | 179/18 GE |

*Primary Examiner*—Thomas W. Brown
*Attorney, Agent, or Firm*—Fleit & Jacobson

[57] ABSTRACT

A bi-directional switching network for a telecommunications exchange in the form of a matrix array of symmetrical switching devices each having many terminations at opposite sides. The switching devices of each row individually have their terminations at one side multipled whereas the switching devices of each column individually have their terminations at the other side multiplied. In a preferred embodiment each switching device includes at least one switching module comprising A-switches, B-switches and a C-switch all of the relay-matrix type; the first two categories of switches being arranged in planes. Connections are usually established over an A-switch and a B-switch of an appropriate plane, but the C-switch is available for interposing between any A-switch and B-switch under heavy traffic conditions and provides for switching between planes.

5 Claims, 6 Drawing Figures

MULTI-STAGE SWITCHING NETWORKS FOR USE IN TELECOMMUNICATIONS EXCHANGES

The present invention relates to multi-stage switching networks for use in telecommunications exchanges and is particularly applicable to switching networks which comprise a plurality of multi-inlet/multi-outlet matrix switches. Typically, although not necessarily, the matrix switches may each incorporate electromagnetic crosspoint relays which are selectively operable by co-ordinate markings, to establish a unique connection between any predetermined pair of terminations at opposite sides of the particular switch. Preferably said relays are of the well-known reed-type comprising encapsulated "make" contact-units located within the tunnel of a control coil; the relays being either of the electro-magnetic holding type or of the kind which hold due to residual magnetism.

The invention will find typical application in a multi-stage switching network serving as a so-called route-switching network in an automatic telephone exchange of the general kind which has been disclosed in British Patent No. 1,393,156. In said disclosure, the route-switching network is employable in conjunction with so-called subscribers' switching networks in the establishment of calls between local subscribers. Additionally the route-switching network provides connections appertaining to incoming and outgoing junction calls and to transit or tandem calls. In the particularly disclosed exchange, the route-switching network, which provides accessibility between the multi-conductor terminations on opposite sides of the network, has an identical number of such terminations on both sides of it. Preferably, each subscribers' switching network serving an arbitrary number of subscribers' line circuits is connected to terminations at opposite sides of the route-switching network by one or more pairs of groups of 15 trunks. Moreover, trunks serving incoming, outgoing and bothway junction routes of the exchange are likewise preferably terminated in equal-number groups on opposite sides of the route-switching network. The terminations at both sides of the network are arbitrarily available for use in calling or called modes.

A route-switching network providing for routing over it of calls in either direction will, in the environment outlined, in most instances employs two-wire speech paths but it is also applicable to four-wire switching involving two-wires for each direction of transmission. The switching network contemplated by the present invention is also applicable to two-wire and four-wire switching.

An object of the present invention is to provide an efficient and reliable multi-stage co-ordinate switching network using matrix switches, and the manner and means for easily adapting the network to meet such switching and traffic requirements as may be encountered.

According to the invention there is provided in or for use in a switching network of a telecommunications exchange, a switching device including at least one symmetrical switching module having first and second terminations at the first and second sides respectively thereof and enabling any termination at either side to be connected to any termination at the other side, characterised in that the module is formed by interconnected matrix switches comprising A-switches and B-switches which are identical and a C-switch, and the A-switches and B-switches serving said first and second terminations respectively are arranged in a predetermined number of identical planes forming a set, each plane comprising the same number of switches of each category, and within each plane each A-switch is directly connected to each B-switch by an individual link, moreover and each A-switch, of all said planes is provided with an individual link extending to one side of said C-switch whereas each B-switch of all said planes is provided with an individual link extending to the other side of said C-switch.

Also according to the invention there is provided a matrix switching network comprising a plurality of symmetrical switching devices each having a plurality of groups of terminations at the opposite sides thereof characterised in that the switching devices are incorporated at co-ordinate locations of the switching network and the devices of each row individually have their terminations at one side thereof multipled together whereas the devices of each column individually have their terminations at the other side multipled together.

The details of the invention will be understood from the following description of the preferred method of carrying it into effect which should be read in conjunction with the accompanying drawings. Of the drawings.

Figure 2:
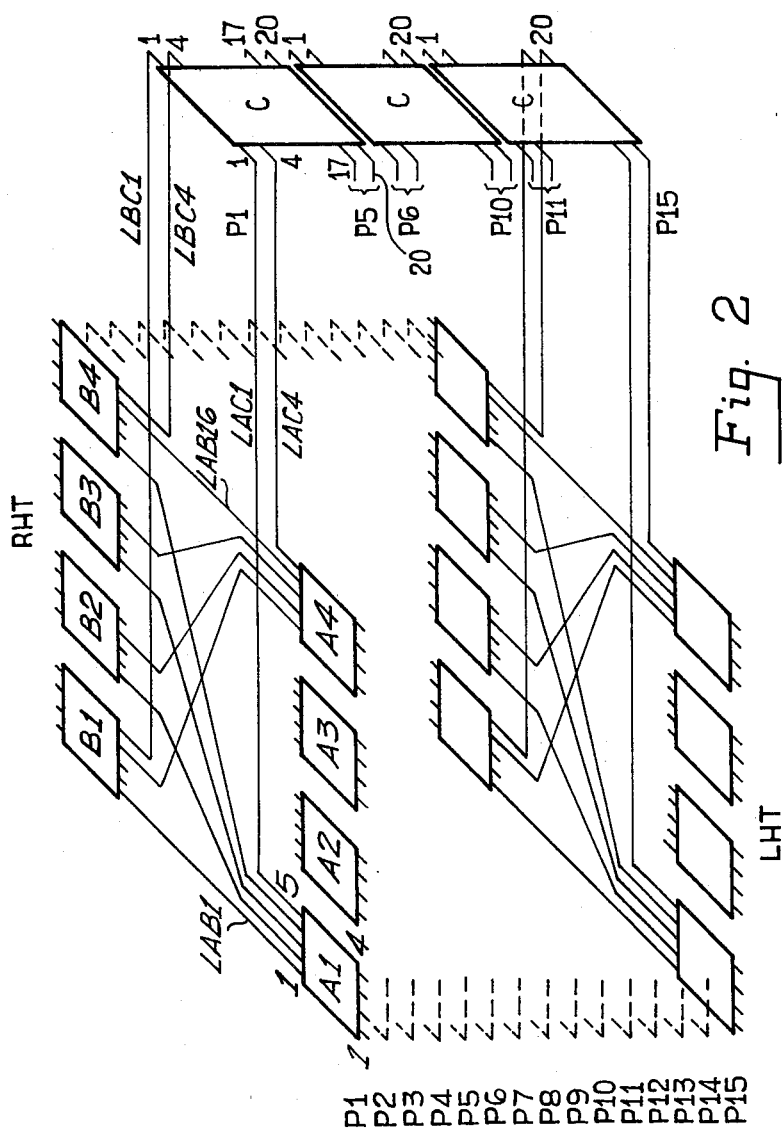
FIG. 2 shows a composite switch for use as a co-ordinate switch in a co-ordinate switching network envisaged by the present invention, and comprises three modules of the kind shown in FIG. 1.
Figures 3, 3A:
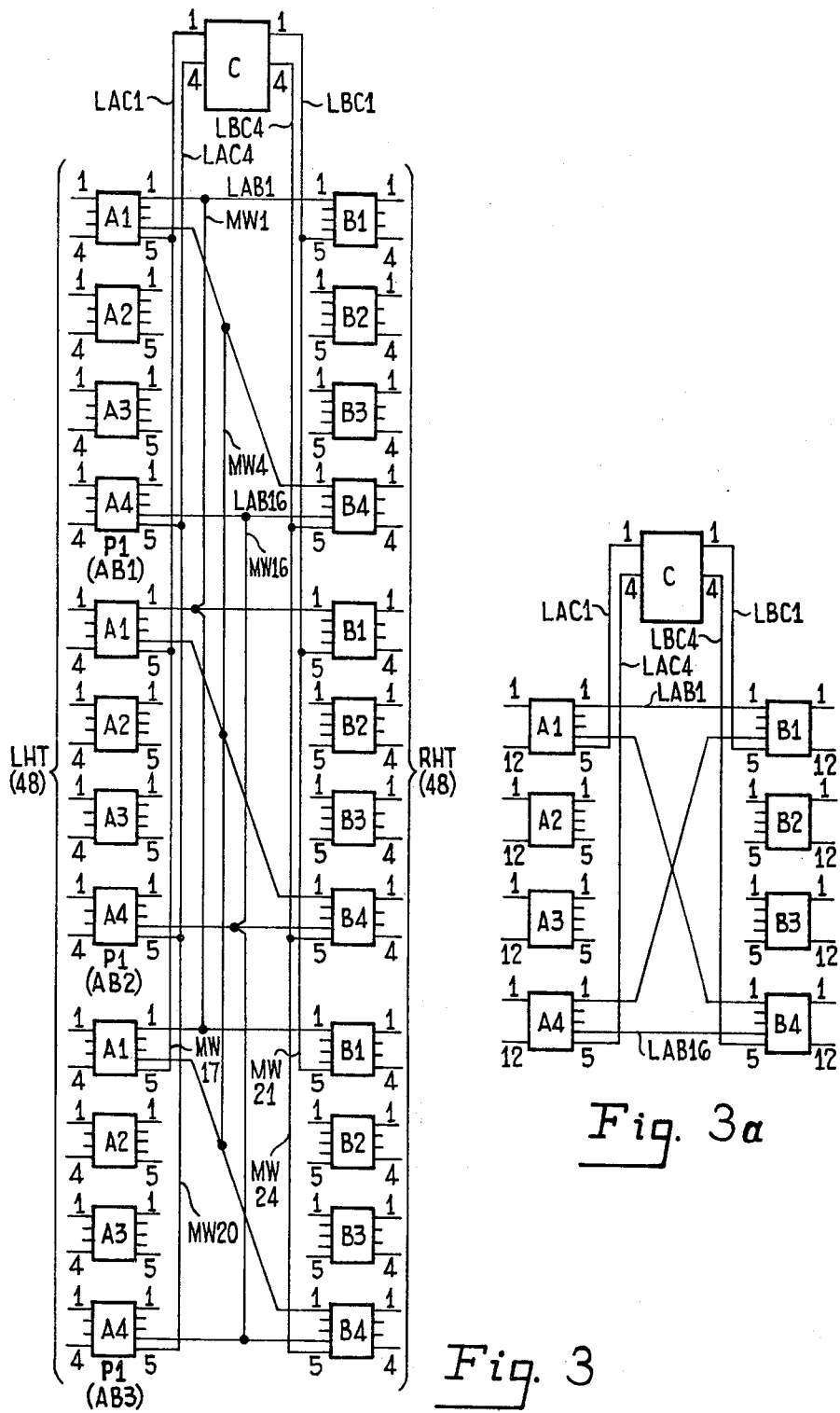
Figure 4:
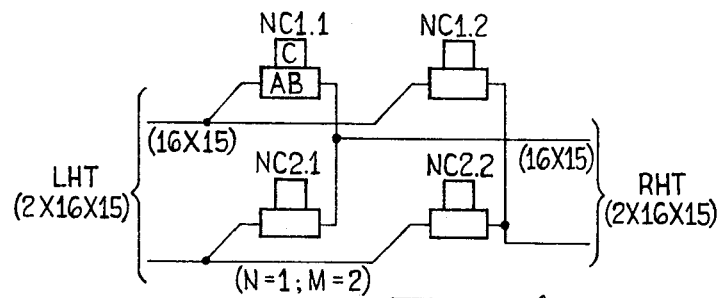
Figure 5:
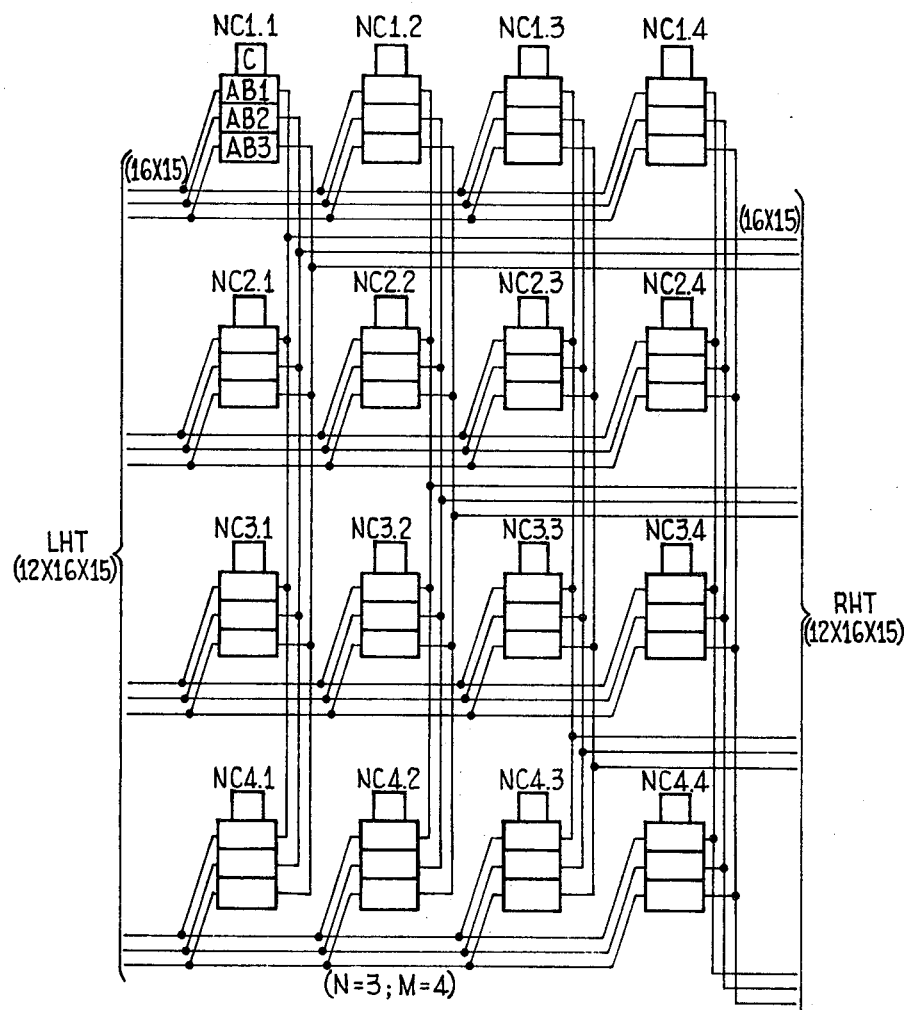

FIG. 3 demonstrates the use of link-multipling between a co-ordinate switch of FIG. 2 and additional switching planes;

FIG. 3a is a trunking diagram comparable with that of FIG. 3;

FIG. 4 represents one of many forms of co-ordinate switching network in accordance with the invention; whereas FIG. 5 shows another, but more complex, form of switching network in accordance with the invention.

In considering the various diagrams it should be understood that trunks, terminations and link connections which are indicated by single lines each comprise a plurality of conductors. Thus assuming that two-wire speech paths are to be catered for, and that the switch crosspoints are held electromagnetically, said lines are indicative of three conductors (two for speech and one for holding) and, of course, each switch crosspoint relay involves three make contacts.

The matrix switches employed in the invention are of the kind referred to in U.S. Pat. Nos. 3,706,856 and 3,882,281, such matrix switches employing marking diodes between its inlet marking leads and the crosspoint relay coils. The control of the switching networks incorporating successive stages of such matrix switches is accomplished by marking arrangements organized to apply requisite marking potential to salient points, i.e., inlet, outlet and links. Preferably, the marking arrangements to be used in the setting-up (and release) of the connections with respect to this invention are similar to those incorporated in the control equipment described in U.S. Pat. No. 3,882,281. Simple modifications to such control equipment can be made in accordance with the relative number of switching stages which is three in the present case and four in the above case.

Figure 1:
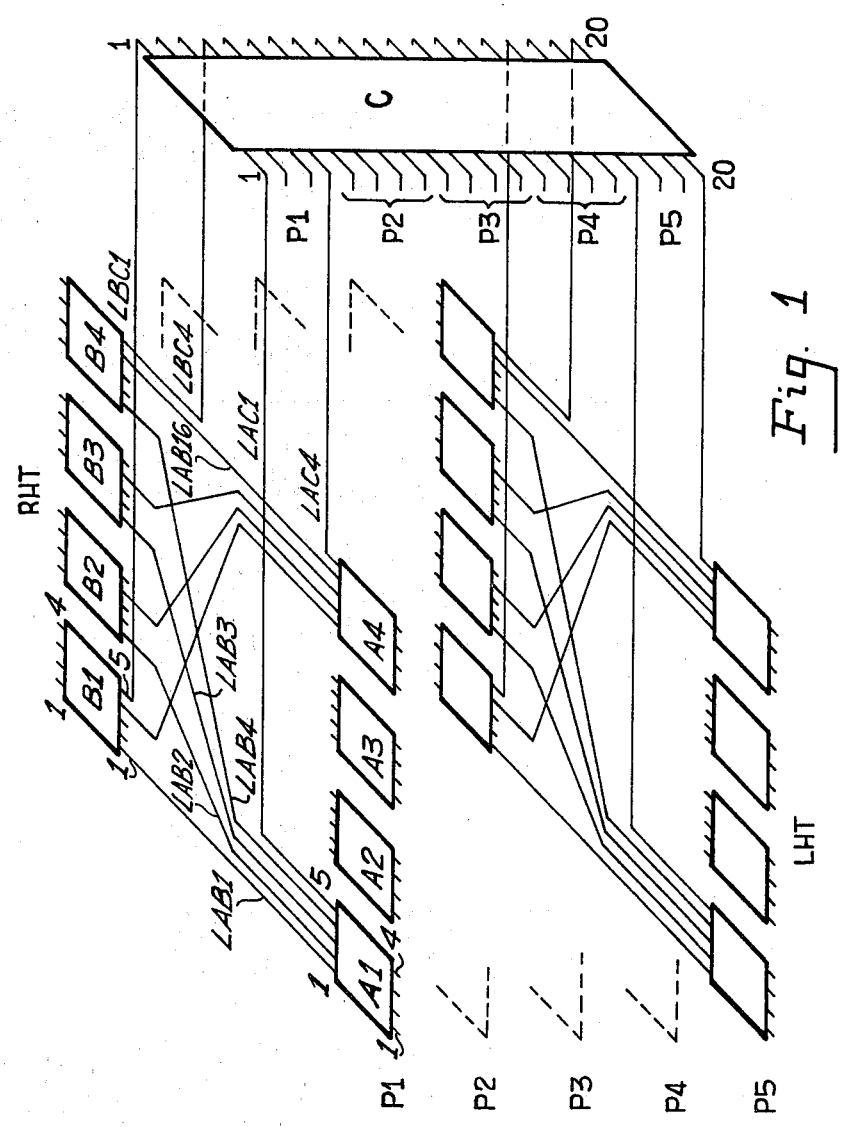
FIG. 1 illustrates a basic form of multi-plane switching module in accordance with the invention.

Considering the basic multi-plane switching module of FIG. 1; this comprises five identical planes P1 to P5 of link-connected A and B matrix switches and a C switch which is common to all planes. Each plane has four A switches (A1 to A4) and four B switches (B1 to B4) each being of the 4 × 5 type in that they have four terminations at one side and five at the other. The four-termination sides of the A switches in the various planes provides the left-hand terminations LHT of the module, whereas the four-termination sides of the B switches constitute the right-hand terminations RHT of the module. The opposing five-termination sides of the A and B switches are used for link connections, and the switch terminations involved will be referred to as inner terminations for convenience.

Considering the left-hand terminations LHT, these present themselves as 16 columns of five; each column comprising a corresponding termination of a corresponding A switch of each plane. The right-hand terminations RHT also present 16 columns of five which are derived from the B switches of the five planes in a similar manner to that mentioned.

Referring to plane P1 in particular, a complete link-interconnection array involving sixteen link LAB1 to LAB16 is provided between the A-stage switches A1 to A4 and the B-stage switches B1 to B4. Thus the inner terminations 1 to 4 of matrix switch A1 are distributed by links LAB1, LAB2, LAB3 and LAB4 to inner terminations 1 of switches B1 to B4 respectively, the inner terminations 1 to 4 of switch A2 are distributed to inner terminations 2 of switches B1 to B4 respectively, and in a corresponding progressive manner switches A3 and A4 are each provided with one link connection to every B switch of the particular plane. It follows that each LHT termination of plane P1 has full accessiblity to all RHT terminations of said plane, and, since each of the remaining four planes has an identical array of A and B switches and 16 links such as LAB1 to LAB16, full accessibility prevails between the left-hand terminations LHT and the right-hand terminations RHT of each plane individually.

Inner terminations 5 of the A and B matrix switches of all five planes remain available for use in conjunction with the 20 × 20 matrix switch C which of course allows for full accessibility between its left-hand and right-hand terminations. Reverting to the typical plane P1, it is observed that inner terminations 5 of switches A1, A2, A3 and A4 are connected by links LAC1, LAC2, LAC3 and LAC4 to left-hand terminations 1 to 4 respectively of the C switch. Moreover the inner terminations 5 of switches B1, B2, B3 and B4 in plane P1 are connected by links LBC1, LBC2, LBC3 and LBC4 to the right-hand terminations 1 to 4 of the C switch. Successive groups of four terminations 5 to 8, 9 to 12, 13 to 16 and 17 to 20, at each side of the C switch are associated with links serving planes P2, P3, P4 and P5 to form a similar pattern of A–C and B–C links for each plane.

Since every A switch of each plane has a separate link to one side of the C switch, and every B switch has a separate link to the other side of the C switch, it follows the C switch constitutes an intermediate switching stage which will enable connections to be established, over three successive matrix switches, between any pair of terminations LHT and RHT at the opposite sides of the module.

When used as part of a co-ordinate route-switching network of a telephone exchange (such as that referred to in British Pat. No. 1,393,156) connections involving exclusively A and B switches are preferably employed, and connections which additionally involve the C switch are, in general, only resorted to when the preferred paths are unavailable or subjected to so-called "blocking". Therefore the C switch, by appreciably increasing the traffic capacity of the module, may be considered as being available to be brought into use under "overflow" or heavy traffic conditions.

Referring to FIG. 2; this represents a three-module composite switch which may be used as, or as part of, a co-ordinate switching device of a network serving as a route-switching network alluded to in the before-mentioned British Patent. The composite switch may be considered as comprising three independent modules identical with that of FIG. 1, and which, from the point-of-view of ease of appreciation, are arranged one above the other. Accordingly sixteen columns of fifteen terminations (LHT and RHT) are provided at appropriate sides of the composite switch. Each said column involves a corresponding termination of a corresponding matrix switch of each of the 15 planes of the composite switch. The number of terminations (i.e. fifteen) in each column has significance in respect of the typical exchange of the before-mentioned British Patent in that trunks from subscribers' switching networks (and generally from elsewhere) are forthcoming in sections of 30, which constitute a so-called "standard interface" for that exchange, so that the present arrangement of the composite switch enables fifteen trunks of a typical group to be connected to its opposite sides; preferably to terminations of corresponding columns.

Although the standard interface of 30 trunks is currently preferred, the possibility of using others of fewer or more trunks is not discarded and it will be understood that a form of composite switch employing fewer or more modules may be used; and indeed the number of planes in each module may be changed if it were to be proved desireable.

FIG. 3 demonstrates a method now proposed for increasing the trunk-groups capacity of a composite switch, such as that shown in FIG. 2, by the introduction of further planes of A and B switches; each plane being identical with each of those already used. Accordingly by providing one additional stack of fifteen A/B switch planes in conjunction with the composite switch of FIG. 2 and by the inclusion of appropriate link-multipling, the termination capacity at both sides of the extended composite switch is doubled, i.e. the number of terminations LHT and RHT at each side would become 2 × 16 × 15. On the other hand if two additional stacks of fifteen A/B switch planes are provided, with appropriate link multipling, the number of terminations at each side becomes 3 × 16 × 15. The C switch provision (such as is shown in FIG. 2 and comprising three 20 × 20 C switches) is not affected when the composite switch is extended by addition of one or more stacks of A/B planes.

In FIG. 3, typical multipling applicable to the use of two additional A/B plane stacks is illustrated in outline, and this is with reference to plane P1 of three 15-plane stacks of which stack AB1 is that incorporated in the initial three-module composite switch of FIG. 2. Plane P1 of the additional stacks AB2 and AB3 is so prefabricated as to include the sixteen A-B links LAB1 to LAB16 and it is a relatively simple matter to insert 16 sets of (say three) multipling wires, such as MW1 to MW16, to inter-connect corresponding A-B links of the three corresponding planes, and to do the same in all other corresponding planes. Eight other sets of multipling wires MW17 to MW20 and MW21 to MW24 are used to associate the A and B switches of the particular plane of the additional stacks with the terminations 1 to 4 of the opposite sides of the upper (FIG. 2) C switch; and again identical multipling would be effected over corresponding remaining planes and taking in appropriate terminations of the existing appropriate C switch.

In comparing FIG. 3 with the equivalent trunking arrangement shown in FIG. 3a it is evident that the same effect as providing 12 × 5 A and B switches in the latter is obtained by the use of three 4 × 5 matrix switches in each case. It will be understood that the advantage accruing from the practice embraced by FIG. 3, is the facility for accommodating the capacity of the composite switch structure to environmental requirements. Thus it may well be that an initially installed exchange may have a route-switching network with composite switches identical with that of FIG. 2 at each of its co-ordinate positions. Eventually a stage of growth in the requirements of the exchange may be reached when it becomes necessary to increase the trunk-group and traffic capacity of the route-switching network. This situation may be met in a relatively simple manner by equipping each co-ordinate switch with an additional 15-plane stack of A/B planes with an internal link multiple for the two stacks. Subsequently due to further growth in the requirements of the exchange, each co-ordinate switch of the route-switching network may be provided with a second additional 15-plane stack of A/B planes and the multiple accordingly extended to embrace the three stacks.

It is convenient to refer to the internal multiple generally as N so that with two stacks involved the situation may be referred to as N=2, as against N=1 where no multipling is provided, or N=3 where the three-stack situation is used as in FIG. 3.

FIG. 4 shows a simple form of route-switching network of two rows and two columns, comprising four network coordinate locations NC1.1, NC1.2, NC2.1 and NC2.2 each comprising a composite switch as shown in FIG. 2. Each such switch comprises one 15-plane stack of A/B matrix switches collectively designated AB and three (one per five-plane module) C switches collectively designated C. Consequently each composite switch has 16 × 15 left-hand terminations LHT and 16 × 15 right-hand terminations RHT. Each row of switches has its LHT terminations multipled together and each column of switches has its RHT terminations multipled so that 32 groups of fifteen trunks are accommodated at each side of the switching network. Bearing in mind the internal trunking of each five-plane switching module of each composite switch of the network, it will be apparent that each trunk of any group of 15 trunks at either side of the switching network has (i) two-stage (A.B) access to a particular trunk of every group at the other side of the network and (ii) three-stage (A.C.B or B.C.A) access to a particular five trunks of every last-mentioned group.

The network of FIG. 4 may be conveniently classified by the term N=1;M=2, in that N=1 signifies that each composite switch involves but one stack of 15 planes whereas M=2 infers that the external multiples embrace two rows and columns of composite switches.

FIG. 5 typifies a larger route-switching network formed by 16 network co-ordinate locations NC1.1 to NC4.4 arranged four rows and four columns. Each location incorporates a 15-plane composite switch as illustrated in FIG. 2 and extended by two additional 15-plane stacks of A/B matrix switches. At the typical co-ordinate location NC1.1 of the diagram, the additional 15-plane stacks are designated AB2 and AB3 whereas the basic composite switch is denoted by its 15-plane A/B switch-stack, AB1, and the three (20 × 20) C switches are collectively designated C. Link-multipling to give the configuration N= 3 in accordance with FIG. 3 is effected, and indeed the particular compact diagrammatic representation at each co-ordinate location such as NC1.1 is intended to infer that internal multipling is involved.

Each extended composite co-ordinate switch provides sixteen groups of 15 terminations LHT or RHT for each of its 15-plane A/B stacks (AB1, AB2 and AB3) at each of its sides. The left-hand terminations of the co-ordinate switches of each row are multipled separately so that the left-hand side of the switching network will accommodate 12 × 16 groups of 15 trunks; and the right-hand terminations of the switches of each column of the network are multipled to provide for a similar number of groups of trunks at the right-hand of the network. The network may be classified as N=3;M=4 of which N=3 indicates that three A/B stacks involved in the link multiple at each co-ordinate location; whereas M=4 infers that the row and column multiples involve four co-ordinate locations.

As in the smaller network of FIG. 4, the network of FIG. 5 gives any trunk, at either side of the network, two-stage access to one trunk, and three-stage access to five trunks, of all fifteen-trunk groups at the other side.

Typical of the extensibility feature which is applicable to switching networks envisaged by the present invention, it might well be that at one stage of development of a particular exchange, the route-switching requirements would be met by a network (N=3;M=3) comprising the equipped co-ordinate locations NC1.1 to NC1.3, NC2.1 to NC2.3 and NC3.1 to NC3.3 of FIG. 5. At a later stage when the full 4 × 4 coordinate network is required for increased trunk and traffic capacity, this is accomplished with the minimum of interference with the existing network; simply by adding other (3N) composite switches at locations NC4.1, NC4.2, NC4.3, NC4.4, NC1.4, NC2.4 and NC3.4 and by introducing multipling (M=4) to embrace the added switches. Obviously at a subsequent stage of development further expansion to the M=5 situation, for example, may be undertaken.

It will be understood that numerous variants to network configurations and to the structure of the component devices used therein can readily be made available. For example a co-ordinate switching network merely involving, at each co-ordinate location, a single 5-plane module such as that of FIG. 1 can be envisaged, and indeed it is possible (albeit unlikely) that the 5-plane modular concept may be discarded for one involving say 4 planes or 6 planes. However, a significant aspect of the present invention is that it allows for growth of a co-ordinate switching network, such as a route-switching network of the kind previously referred to in two ways, firstly by extending the termination-capacity of the composite switches by adding and link-multipling (N) one or more A/B switch stacks, and secondly by a two way expansion of the network by provision of additional switching co-ordinates with the consequential extension of vertical and horizontal multiples (M) embracing opposite sides of the co-ordinate switches.

Another variant to any switching network may be brought into effect as a result in a general change in the traffic flow whereby a considerable increase in the traffic is required to be carried by the switching device, i.e. composite switch, at any particular co-ordinate location. In this case another identical switching device may be connected in parallel with that already installed so that the existing left- and right-hand terminations are served by twice the original switching capacity.

The practicability of the various aspects of the invention is greatly assisted by the fact that the various parts can be fabricated in the form of plug-in units of less than a foot square and a few inches in thickness. The units are arranged to be slideably mounted, edgewise, into rack or console shelves which are about three feet wide. One such shelf would typically accommodate thirteen such units of which the first and second from the left would each accommodate half (20 × 10) of a C switch, the next five would each accommodate the eight 4 × 5 switches of an A/B switching plane, the next unit would incorporate marker access equipment, whereas the next five units would incorporate another five switching planes.

It may be mentioned mulitpled connections (N and M previously mentioned) will preferably take the form of plug/jack end cables which, as required, may be terminated on shelves of the same or different equipment. The form of cabling also ensures that network extensions may be introduced without disturbing the existing network.

What we claim is:

1. A matrix switching network for switching between first multi-conductor trunks at one side thereof and second multi-conductor trunks at the other side thereof, comprising a plurality of switching devices arranged symmetrically in columns and rows comprising at least two stages of matrix switches at each co-ordinate location, said switching devices of each individual row having terminations at one side thereof multipled and connected selectively to the first trunks and said switching devices of each individual column having terminations at the other side multipled and connected selectively to the second trunks.

2. A switching network as claimed in claim 1 in which each switching device includes at least one symmetrical switching module having first and second terminations at the first and second sides respectively thereof, with each of said terminations at either side arranged to be connected selectively to the terminations at the other side, said module comprising interconnected matrix switches including A-switches and B-switches which are identical and a C-switch, said A-switches and B-switches arranged in a predetermined number of identical planes forming a set, each plane comprising the same number of switches of each of the A-switch and B-switch type, each of said A-switches being directly connected to each of said B-switches by an individual link, and wherein each of said A-switches in all of said planes is provided with an individual link extending to one side of said C-switch and wherein each of said B-switches in all of said planes is provided with an individual link extending to the other side of said C-switch.

3. A switching network as claimed in claim 2 in which each said symmetrical switching module is arranged to provide access between said first and second trunks at opposite sides thereof, each trunk of each of said first and second trunks at one side being connected to a corresponding termination of a corresponding A-switch of each plane in each of said switching modules and wherein each trunk of each of said first and second trunks at the other side is connected to a corresponding termination of a corresponding B-switch of each plane in each of said switching modules.

4. A switching network as claimed in claim 3 wherein each of said switching modules is provided with at least one additional set of planes being identical with said set, and including internal link-multiplying between corresponding planes of each of said sets for increasing the termination capacity of said modules.

5. A switching network as claimed in claim 3 wherein all of said matrix switches include electromagnetic reed-contact crosspoint relays and wherein each of said symmetrical switching modules, said A-switches and B-switches are of the 4 × 5 type and the C-switch is of the 20 × 20 type, the five-paths sides of the A-switches and the B-switches being employed for the link-connections.

* * * * *